United States Patent
Zobbe

(10) Patent No.: US 9,055,731 B2
(45) Date of Patent: *Jun. 16, 2015

(54) METHOD, FEED CART AND SYSTEM FOR FEEDING OF FUR ANIMALS

(71) Applicant: JASOPELS A/S, Bording (DK)

(72) Inventor: Kenneth Storgaard Zobbe, Struer (DK)

(73) Assignee: JASOPELS A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,728

(22) Filed: May 22, 2014

(65) Prior Publication Data

US 2014/0251222 A1   Sep. 11, 2014

Related U.S. Application Data

(63) Continuation of application No. 13/819,386, filed as application No. PCT/DK2011/000097 on Aug. 26, 2011, now Pat. No. 8,752,505.

(30) Foreign Application Priority Data

Aug. 27, 2010 (DK) ................................. 2010 00758
Mar. 22, 2011 (DK) ................................. 2011 00203

(51) Int. Cl.
A01K 5/02 (2006.01)

(52) U.S. Cl.
CPC ................ *A01K 5/02* (2013.01); *A01K 5/0266* (2013.01)

(58) Field of Classification Search
CPC ... A01K 5/0266; A01K 5/0275; A01K 1/031; A01K 5/02; A01K 5/0216; A01K 61/02; A01K 29/00; A01K 39/01; A01K 5/001; A01K 5/0291
USPC .............. 119/51.02, 61.2, 457, 51.11, 51.12, 119/52.4, 57.1, 57.4, 57.92, 456
See application file for complete search history.

(56) References Cited

U.S. PATENT DOCUMENTS

| | | | |
|---|---|---|---|
| 3,587,529 A | 6/1971 | Wienert |
| 3,664,302 A | 5/1972 | Weinert |
| 4,715,323 A | 12/1987 | Malestein |
| 4,907,538 A | 3/1990 | Helmle et al. |
| 5,064,012 A | 11/1991 | Losego |
| 5,129,361 A | 7/1992 | Deutsch et al. |
| 5,424,957 A | 6/1995 | Kerkhoff et al. |
| 6,606,966 B1 | 8/2003 | Teachey et al. |
| 7,870,840 B2 | 1/2011 | Valencia et al. |
| 8,499,719 B2 | 8/2013 | Brocca et al. |

FOREIGN PATENT DOCUMENTS

| | | |
|---|---|---|
| DK | 264369 A1 | 2/1989 |
| DK | 176402 B1 | 11/2007 |
| JP | 02300903 A | 12/1990 |
| JP | 04310821 A | 11/1992 |
| JP | 2000065571 A | 3/2000 |
| JP | 2001075648 | 3/2001 |
| WO | 2008101500 A1 | 8/2008 |

OTHER PUBLICATIONS

International Search Report for corresponding application No. PCT/DK2011/000097 filed on Aug. 26, 2011; Mail date Apr. 2, 2012.

*Primary Examiner* — Yvonne Abbott-Lewis
(74) *Attorney, Agent, or Firm* — Cantor Colburn LLP

(57) ABSTRACT

A method for positioning an individually metered out food portion on an animal cage arranged in a row of animal cages for fur animals, in particular mink, by means of a motorized feed cart having wheels, at least one driving wheel, and a feed container, the method including moving the feed cart along a row of animal cages, thereby turning the wheels of the feed cart, determining by means of the control unit that the feed cart has reached a given position corresponding to a given cage and a database of information related to at least positions of animal cages and desired size of food portions to each animal cage, controlling the feed cart to metering out the desired food portions at a suitable food delivering place at the given animal cage according to the information in the database, determining by means of the control unit and the database whether a medication should be provided at the given animal cage, and metering medication out according to the information in the database.

7 Claims, No Drawings

METHOD, FEED CART AND SYSTEM FOR FEEDING OF FUR ANIMALS

CROSS REFERENCE TO RELATED APPLICATIONS

This application is a continuation of U.S. patent application Ser. No. 13/819,386 filed on 27 Feb. 2013 under 35 U.S.C. 371 as the National Stage of International Patent Application Number PCT/DK2011/000097 which was filed on 26 Aug. 2011 claiming priority to Danish Patent Application Number PA 2010 00758 filed on 27 Aug. 2010 and to Danish Patent Application Number PA 2011 00203 filed on 22 Mar. 2011, all of said applications being herein incorporated by reference in their entirety.

FIELD OF THE INVENTION

The invention relates to a method, a feed cart and a system for feeding of animals, and more particularly to feeding of minks and other fur-bearing animals.

BACKGROUND OF THE INVENTION

Fur animals, particularly mink, are to be supplied with fresh feed at regular intervals, preferably daily. With a large number of animals, and hence cages, on each farm this may be a highly time-consuming task. Therefore effort has been put into finding ways to automate the feeding of such animals.

WO2008/101500 describes an unmanned motorized feed cart, which by means of sensors is guided along a guide wire or other signal emitter which may be disposed at the floor along a row or between rows of fur animal cages. Communication equipment is provided on the feed cart adapted for communicating with RFID-tags on each animal or each cage.

A disadvantage related to this automated feed cart is that the use of RFID-tags for each cage or even each animal on a mink farm scale may both involve extra work with the RFID-tags and furthermore it may be an expensive solution.

Further, at fur animal farms the conditions may be very harsh to electronic devices, e.g. due to risk of soiled/contaminated surfaces and/or higher levels of certain damaging gasses in the surroundings. Consequently, the use of RFID-tags, cameras etc. as described in WO2008/101500 may be unreliable.

It is therefore an object of the present invention to provide a simpler and more reliable feeding method to facilitate an improved feeding routine for feeding minks and other fur-bearing animals.

SUMMARY OF THE INVENTION

The invention relates to a method for positioning an individually metered out food portion on an animal cage arranged in a row of animal cages for fur animals, in particular mink, by means of a motorized feed cart having wheels, at least one driving wheel, and a feed container, the method including moving the feed cart along a row of animal cages, thereby turning the wheels of the feed cart, determining by means of the control unit that the feed cart has reached a given position corresponding to a given cage and a database of information related to at least positions of animal cages and desired size of food portions to each animal cage, controlling the feed cart to metering out the desired food portions at a suitable food delivering place at the given animal cage according to the information in the database, determining by means of the control unit and the database whether a medication should be provided at the given animal cage, and metering medication out according to the information in the database.

With the present invention a simpler and more reliable method of positioning individually metered out food portions to a row of animal cages is obtained. All elements possibly vulnerable to contamination used in the present invention are kept away from the very close surroundings of the mink and are instead e.g. part of the feed cart, for which the risk of contamination is smaller, since the feed cart may be positioned away from direct or almost direct contact with the animals when not in use. By use of the encoder instead of e.g. RFID-tags it is hereby made possible to more reliably speed up the process of feeding.

In the present invention, an encoder is used to couple the angular turning of one of said wheels to a distance travelled by the feed cart in order to reach a desired position. This coupling can be done due to a correlation between the angular turning of the wheel and the movement path of the feed cart. Consequently, the control unit is capable of, on the basis of the output from the encoder, estimating the distance the feed cart moves. As a result the control unit can read information from the database about where and when food portions should be given and then control the feed cart to perform this food delivery.

The present invention is in particularly usable for animals that are raised in arrayed fur animal cages of wire mesh in fur farms. These are typically fed with a mink feed mix with a consistency that enables dosing feed portions from a container of a feed cart via a hose or pipe and mouthpiece by means of a pump. When feeding, the feed portions may be placed upon a wire mesh side of the fur animal cage, as the consistency/density of the feed may be controlled in order to avoid that feed portions or parts thereof fall down through the wire mesh side.

With the present invention it is made possible to perform an automatic ideal individual feeding of the animals on the basis of information stored in the database, such that e.g. a large mink is given a larger portion of food than a small mink.

In an embodiment of the invention, said determining by means of the control unit comprises the step of adjusting an ideal relationship between the radius of the wheel on which said encoder measures angular turning and the distance travelled of the feed cart into an actual relationship on the basis of flattened tires due to the current weight of the feed cart with feed.

The radius of the unloaded wheel, on which said encoder measures angular turning, can be directly measured. From this an ideal relationship between the radius of the wheel on which said encoder measures angular turning and the distance travelled of the feed cart can easily be calculated through the well-known formula $O=2\pi R$, where O is the circumference and R is the radius.

However, when load is put on the wheel, it is no longer an ideal situation, and as such the weight of the feed in the feed cart must be taken into account. In a typical filled feed cart the weight of the feed may be app. 2 tons, which obviously will affect the effective radius of the wheels since the tires will obtain a more flattened shape than in an unloaded situation.

At the beginning of a feeding routine, or even once and for all for a specific feed cart, the impact of the load on the feed cart on the relationship between encoder output and distance travelled can be measured, and such recorded actual relationship between encoder output and distance traveled can then be used for the determining step. In other words the start weight of the feed cart can be calculated or measured and the deformation of the wheel can then be estimated on the basis of the previously recorded values.

While running the feed cart, the actual weight of the feed cart can be monitored, either by a direct weighing or by monitoring the amount of feed being delivered to the animals and as such leaving the feed cart. This means that while running the feed cart, the instant deformation of the wheels is known by the control unit and is used to adjust the radius of the wheels.

In an embodiment of the invention, said feed container comprises an integrated weighing machine, which via communication equipment is connected with said control unit.

In an embodiment of the invention, the feed container is manufactured with an integrated weighing machine, which via communication equipment is connected with the control unit. Hereby the remaining amount of feed can be monitored continuously. As described above, this weight can be used to calculate the impact on the determining of the position due to flattened tires due to large weight in the feed cart.

In an embodiment of the invention, said encoder is mounted on a wheel of said feed cart, preferably a driving wheel.

In an advantageous embodiment of the invention the encoder is mounted on a driving wheel of the feed cart, which may increase the accuracy of the relationship between turning of the encoder and distance moved of the feed cart.

In an embodiment of the invention, said encoder is an optical encoder with a row of passages in a circular pattern, said encoder comprising at least one light source and at least one photo detector.

In a preferred embodiment of the invention, the encoder is an optical encoder. Typically it comprises a disc made of any suitable material with a row of passages in a circular pattern. The photo detector then receives a pulse each time the disc has rotated a certain angle to a next passage. Said pulse is then used for the output to said control unit.

In another embodiment of the invention, the encoder is a magnetic encoder.

In an embodiment of the invention, said optical encoder comprises at least two photo detectors and two concentric rows of passages, wherein said rows are slightly shifted in relation to each other in order for the signal from the encoder to reflect whether said feed cart runs forward or backwards.

By using two concentric rows of passages slightly shifted, it can easily be seen from the pulses received by the two photo detectors that the first pulse coming first indicates a forward movement and the first pulse coming last indicates a backward movement, or the opposite around depending on the specific design of the encoder. Said pulses are then used for the output to said control unit.

Hereby the control unit is able to register a backward travelling as well, if for instance the feed cart for some reason, e.g. meeting an obstacle, has to back a little bit before continuing. Hereby the control unit will know the position through both forward and backward motion of the feed cart.

In an embodiment of the invention, said method further comprises an adjusting step for adjusting the recorded position of the feed cart in relation to the animal cages, wherein said adjusting step is carried out with a suitable light-emitter, such as a laser, and a suitable detector measuring the distance to known positions such as vertical bearing beams.

Even though the determining of the position carried out in the control unit according to the present invention provides a good knowledge of position of the feed cart and thus enables the control unit to know when to deliver which amounts of feed to the cages, the determining step cannot take into account any kind of possible obstacles or other unpredictable issues which may impact the movement of the feed cart. For instance the wheel with the encoder may shortly slide (instead of rotating) on a piece of dirt on the ground, which may lead the control unit to believe the feed cart is temporarily not moving. Another problem may arise if the wheel with the encoder hits a hole in the ground, which may lead the control unit to believe the feed cart is temporarily moving faster than it really is.

In order to lessen problems with such inaccuracy, a laser or another suitable light-emitter may be mounted on the feed cart together with a suitable detector. Suitable detectors will be known to the skilled person in the art. This laser/detector may then be used to register when passing known positions such as vertical bearing beams of the cages. Such beams are typically positioned for each 6 to 8 animal cages. If the result of the measurement does not fit with the information in the control unit, displacements with regard to position may automatically be adjusted and in case of a major displacement this may be signalled to the user or another person, possible together with an automatic stop of the feed cart, thereby ensuring the avoidance of errors through a large number of animal cages.

In an embodiment of the invention, said control unit comprises means to enable a user to indicate a present position of the feed cart at the beginning of a row. Alternatively this information may be given automatically to the feed cart by suitable signaling means positions at the beginning/end of each row.

It is furthermore advantageous that the method further comprises the steps of:
  determining by means of the control unit and said database whether a medication should be provided at the given animal cage, and
  metering medication out according to the information in the database.

Medication of the animals in the cages, such as antibiotics, are today either provided manually to the animals that have been identified having an infection in need of treatment or mixed up in the feed so that the medication is administered to all animals. The manual administration is highly demanding in manpower and is therefore costly, whereas the general administration of antibiotics to all animals increases the risk of resistant microorganism to spread among the animals and is generally not recommended. Therefore, it is advantageous that the individual feeding of the animals made possible with the present invention is combined with individual administration of medication to animals that have been identified as being in need of such treatment and where this information have been entered into the database.

In a preferred embodiment, the outlet for the medication is provided at a food outlet of the feed card, so that said metered out medication is delivered together with the metered out food portion.

The individual administration of medication to the cages and thus to the animals in the cages may also be applied more broadly, that is by means of feed carts with other means for determining the position of the feed cart, such as the RFID-tags, cameras etc. as mentioned in the previous section Background of the Invention.

In an embodiment of the invention, said feed cart is a motorized feed cart with movement controlled by a user, wherein said user controls said turning of the driving wheel.

In an embodiment of the invention, the movement of the feed cart can be controlled by a user with a standard control panel.

In an embodiment of the invention, said feed cart is an unmanned motorized feed cart, wherein said movement of the feed cart is carried out automatically by a control unit controlling said feed cart.

An unmanned motorized feed cart may be used, which may be carried out e.g. with the feed cart being guided by means of sensors along a guide wire or other signal emitter which, for example, is disposed at the floor along a row of fur animal cages or between rows of fur animal cages.

Moreover the invention relates to a motorized feed cart for performing the method according to claim 1, wherein said feed cart comprises wheels, at least one driving wheel, and a feed container, wherein a control unit is provided for determining the position of the feed cart and for metering out food, said control unit having access to a database of information related to at least positions of animal cages and desired size of food portions to each animal cage, and wherein said feed cart comprises at least one encoder capable of providing an output corresponding to the angular turning of one of said wheels to said control unit, wherein said control unit is adapted to determining the position of said feed cart on basis of said output.

In an embodiment of the invention, said encoder is mounted on at least one of said wheels, preferably a driving wheel.

Moreover the invention relates to a system for performing the method according to claim 1 comprising a feed cart with an encoder, a control unit, a database, and fur animal houses or halls with fur animal cages arrayed so that a driveway is established along the fur animal cages or between the fur animal cages.

DETAILED DESCRIPTION

A feed cart to be used according to the present invention will typically be a motorized feed cart with upwards open feed container and with feed outlets at both sides via two tubular arms with optional articulated joints. The engine may typically be an electric engine, or alternatively a combustion engine. In a typical design, the feed cart has two driving wheels with pneumatic tires, although four driving wheels are possible as well. The driving wheels may be pivotably mounted at a front and/or rear axle.

The feed cart may typically be operated in passages between rows of animal cages with distances to the side to the animal cages being only 10-15 cm. Therefore, during operation of the feed cart it is running in substantially straight lines apart from when reaching the ends of the animal cage rows. Consequently a correction in the correlation between angular turning and movement of the feed cart due to turning of the feed cart along the row is not necessary; however if desired, such feature may easily be implemented, e.g. by using encoders on two wheels.

The feed cart further includes a dosing pump, which is able to dose rather precise feed portions to be delivered at the top of a wire mesh side of a fur animal cage. In an embodiment of the feed cart, the tubular arms imply great mobility in order to allow the feed cart to deliver food to fur animal cages at more levels.

The feeding takes place at one or more sides of the feed cart, and the amount of food to be given is determined by information from the database of a central control unit. The information in the database may be updated as often as necessary, e.g. by directly input on the control unit.

The feed cart may also comprise an arrangement for metering out a medicament, such as an antibiotic, for the treatment of individual animal according to information relating thereto in the database. The outlet of this arrangement is preferably placed in or very close to the feed outlet, so that the metered medicament will be delivered together with the feed to the individual cage.

According to one embodiment of the invention, the feed cart may deliver food while moving, and in another embodiment the feed cart may slow down or even stop while delivering food. Obviously these two embodiments may be combined within the scope of the invention.

The information from the database may be obtained by the control unit via e.g. a wireless network connection to a central computer, or the database may be stored local.

The invention claimed is:

1. A method for positioning an individually metered out food portion on an animal cage arranged in a row of animal cages for fur animals, in particular mink, by means of a motorized feed cart comprising wheels, at least one driving wheel, and a feed container, said method comprises the steps of:
    moving said feed cart along a row of animal cages, thereby turning the wheels of the feed cart,
    determining by means of the control unit that the feed cart has reached a given position corresponding to a given cage and a database of information related to at least positions of animal cages and desired size of food portions to each animal cage,
    controlling the feed cart to metering out the desired food portions at a suitable food delivering place at the given animal cage according to the information in said database,
    determining by means of the control unit and said database whether a medication should be provided at the given animal cage, and
    metering medication out according to the information in the database.

2. A method according to claim 1, wherein an outlet for the medication is provided at a food outlet of the feed cart, so that said metered out medication is delivered together with the metered out food portion.

3. A method according to claim 1, wherein said feed cart is a motorized feed cart with movement controlled by a user, wherein said user controls said turning of the driving wheel.

4. A method according to claim 1, wherein said feed cart is an unmanned motorized feed cart, wherein said movement of the feed cart is carried out automatically by a control unit controlling said feed cart.

5. A motorized feed cart for performing the method according to claim 1, wherein said feed cart comprises wheels, at least one driving wheel, and a feed container, wherein a control unit is provided for determining the position of the feed cart and for metering out food, said control unit having access to a database of information related to at least positions of animal cages and desired size of food portions to each animal cage, wherein the database further comprises information relating to distribution of medication to at least a portion of animal cages, and wherein the control unit is provided for determining by means of the control unit and said database whether a medication should be provided at the given animal cage, and metering medication out according to the information in the database.

6. A cart according to claim 5, wherein an outlet for the medication is provided at a food outlet of the feed cart, so that said metered out medication will be delivered together with the metered out food portion.

7. A system for performing the method according to claim 1 comprising a feed cart with a control unit, a database, and fur animal houses or halls with fur animal cages arrayed so that a driveway is established along the fur animal cages or between the fur animal cages.

* * * * *